(12) United States Patent
Okuyama et al.

(10) Patent No.: US 8,219,806 B2
(45) Date of Patent: Jul. 10, 2012

(54) MANAGEMENT SYSTEM, MANAGEMENT APPARATUS AND MANAGEMENT METHOD

(75) Inventors: Koji Okuyama, Inagi (JP); Hideyuki Inaoka, Inagi (JP); Takahisa Fujishima, Inagi (JP); Eiichi Watanabe, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 920 days.

(21) Appl. No.: 11/707,983

(22) Filed: Feb. 20, 2007

(65) Prior Publication Data
US 2008/0072042 A1 Mar. 20, 2008

(30) Foreign Application Priority Data
Sep. 15, 2006 (JP) .................................. 2006-251293

(51) Int. Cl.
*H04L 29/06* (2006.01)
(52) U.S. Cl. ...................................... 713/164; 380/277
(58) Field of Classification Search .................. 713/164; 380/277
See application file for complete search history.

(56) References Cited

U.S. PATENT DOCUMENTS

| | | | |
|---|---|---|---|
| 7,802,112 B2 | 9/2010 | Yasaki et al. | |
| 2002/0116342 A1 | 8/2002 | Hirano et al. | |
| 2003/0174842 A1* | 9/2003 | Challener | 380/277 |
| 2004/0230817 A1* | 11/2004 | Ma | 713/193 |
| 2005/0163317 A1* | 7/2005 | Angelo et al. | 380/259 |
| 2005/0235141 A1* | 10/2005 | Ibrahim et al. | 713/164 |
| 2006/0053302 A1 | 3/2006 | Yasaki et al. | |
| 2006/0064752 A1 | 3/2006 | Wang et al. | |
| 2006/0161784 A1* | 7/2006 | Hunter et al. | 713/182 |
| 2006/0256106 A1* | 11/2006 | Scarlata et al. | 345/418 |
| 2007/0003064 A1* | 1/2007 | Wiseman et al. | 380/281 |

FOREIGN PATENT DOCUMENTS

| | | |
|---|---|---|
| JP | 11-289328 A | 10/1999 |
| JP | 2002-245235 A | 8/2002 |
| JP | 2004-135195 A | 4/2004 |
| JP | 2004-282391 A | 10/2004 |
| JP | 2006-080636 A | 3/2006 |
| JP | 2006-92533 A | 4/2006 |
| JP | 2006-109178 A | 4/2006 |

OTHER PUBLICATIONS

Japanese Office Action dated Oct. 18, 2011, issued in corresponding Japanese Patent Application No. 2006-251293. "Internal security chip (TPM) user guide", Japan, Panasonic [Online], 2005, [Searched on Apr. 18, 2012], Internet, URL, <http://pc-dl.panasonic.co.jp/public/s_manual/R4T4W4Y4mk2TPM_X_J_RM_B.pdf>; 52 pages w/ partial English translation.
Japanese Office Action dated May 8, 2012, issued in corresponding Japanese Patent Application No. 2006-251293; 6 pages.

* cited by examiner

*Primary Examiner* — Vivek Srivastava
*Assistant Examiner* — Thong Truong
(74) *Attorney, Agent, or Firm* — Westerman, Hattori, Daniels & Adrian, LLP

(57) ABSTRACT

The present invention relates to a management system, and this management system comprises a storage unit for storing information specifying a terminal apparatus and a restoration user information file cipher key related to a security function module in a state associated with each other and a transmission unit for transmitting the restoration user information file cipher key to the terminal apparatus in response to a calling request from the terminal apparatus for the restoration user information file cipher key. This enables the reduction of the man-hour to be taken by a terminal manager and the management of a situation of use of the restoration user information file cipher key.

14 Claims, 11 Drawing Sheets

241

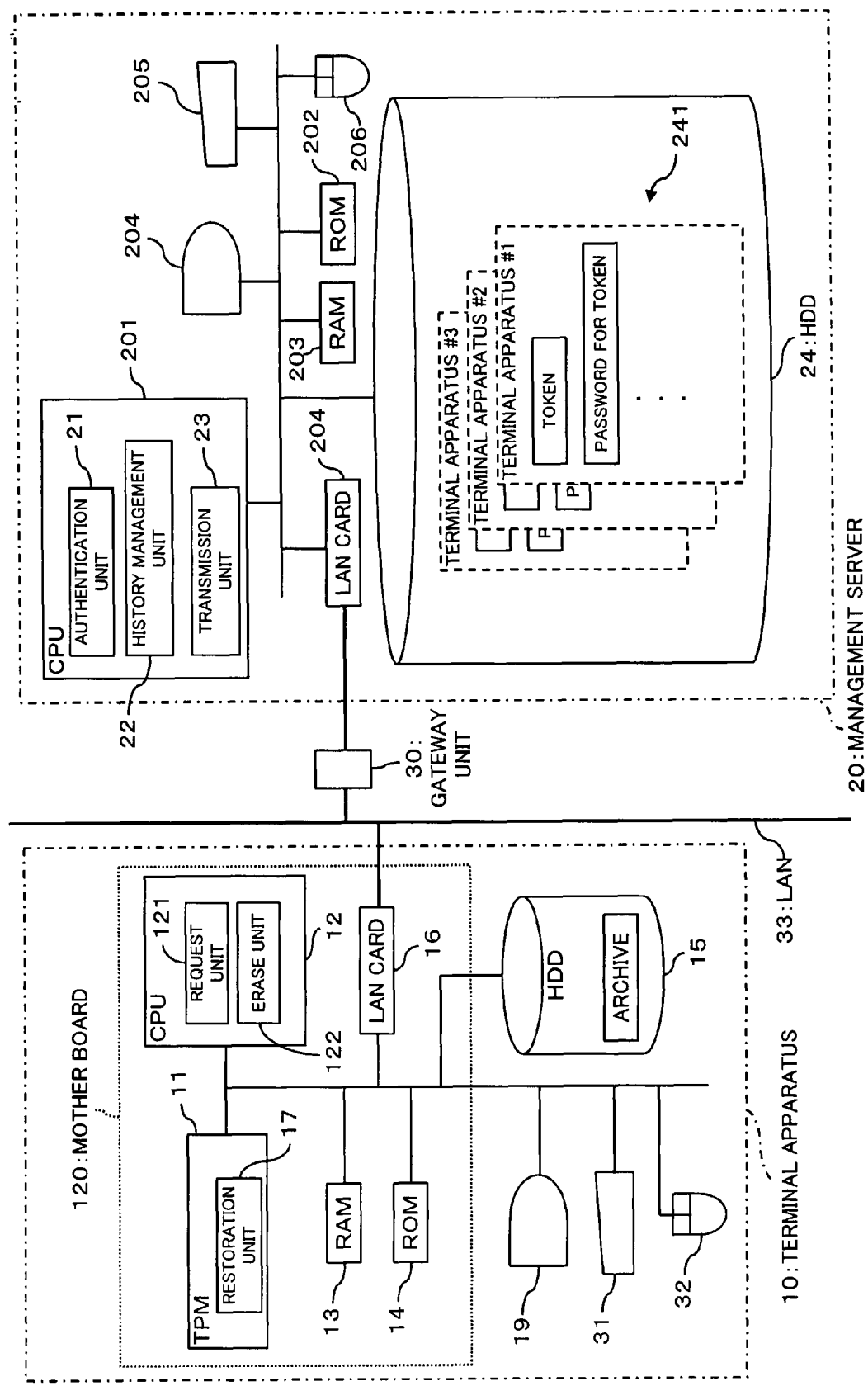

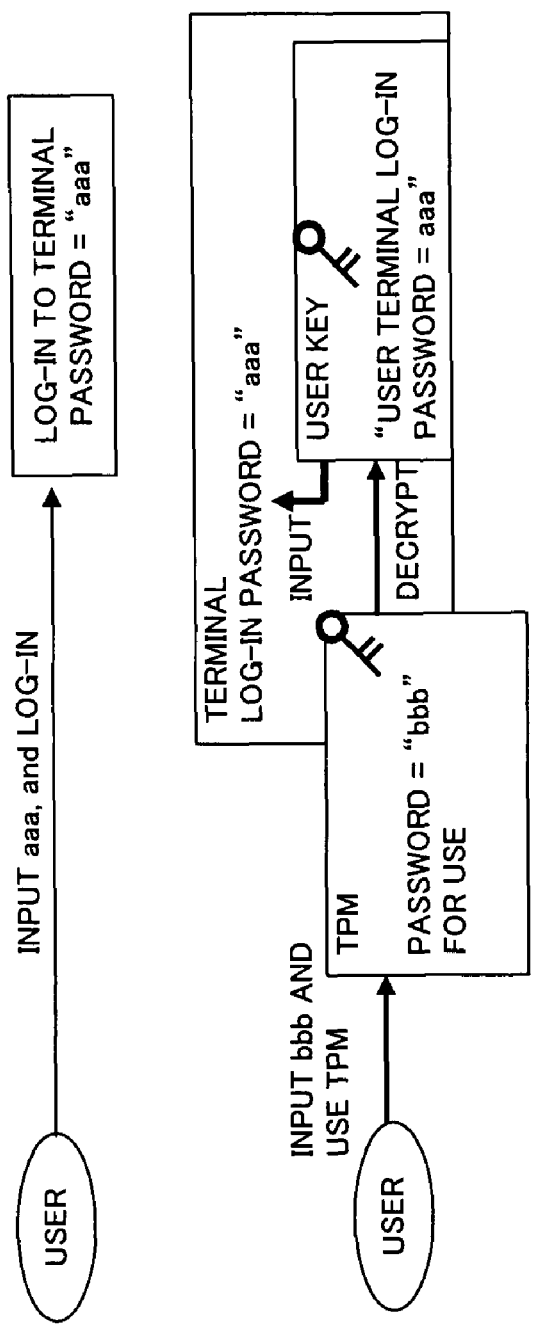
FIG. 9A
FIG. 9B

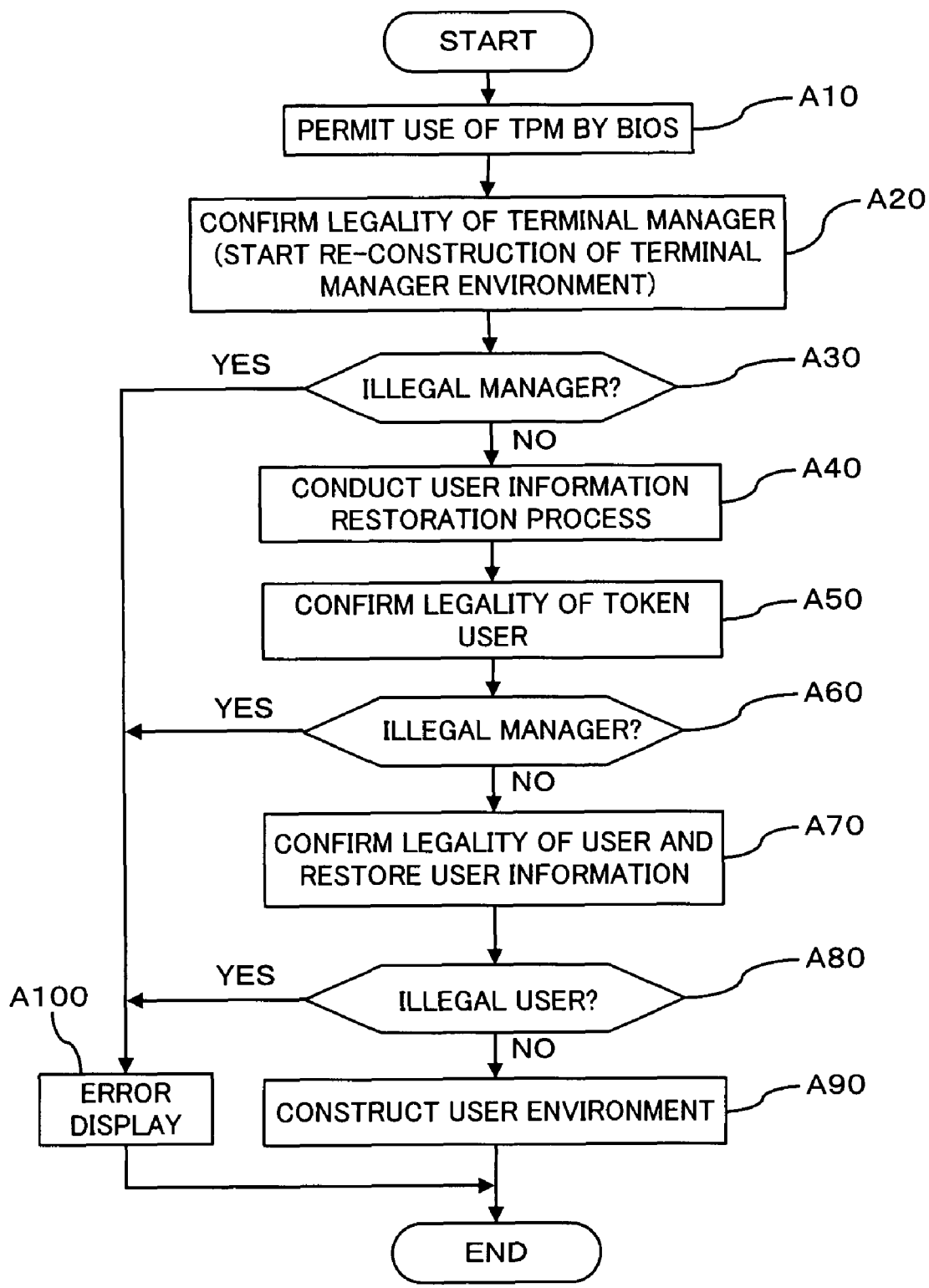

MANAGEMENT SYSTEM, MANAGEMENT APPARATUS AND MANAGEMENT METHOD

BACKGROUND OF THE INVENTION (1) Field of the Invention

The present invention relates to a technique of managing a token for restoring user security information in a security chip such as a TPM (Trusted Platform Module).

(2) Description of the Related Art

In recent years, there has been known an information processing terminal (information processing apparatus) internally containing a security chip (security function module) such as a TPM (Trusted Platform Module) for the improvement of the security level.

The TPM is a security chip based upon a specification defined by the TCG (Trusted Computing Group) which is an industry standard group. For example, it is packaged in a mother board of an information processing terminal, and includes a non-volatile memory storing a cipher key (core cipher key) for use in secure communications and a microprocessor dedicated to cipher processing. Moreover, with the arrangement of the TPM, a core cipher key stored in the non-volatile memory cannot be fetched to the external.

For example, this TPM has various types of cipher processing functions (RSA cipher processing, random number generation, and others), combined with functions to make a verification as to whether or not a platform complies with the specification of the TCG and to make a check as to whether or not the hardware or software is falsified and further to protect a cipher key (core cipher key) stored in the TPM from being outputted to the external.

In addition, for example, through the use of a core cipher key (user key) stored in a non-volatile memory, the TPM is made to realize a security management on a hardware level by not only encrypting a cipher key to be used for applications or the like but also generating a cipher key (user key) for each user and even checking an illegal falsification of BIOS (Basic Input Output System), illegal replacement or the like at the activation of an information processing terminal so as to, if there is some illegality, prevent the activation thereof.

The core cipher key stored in the TPM is unique to each TPM and, hence, the TPM cannot operate normally in a case in which the TPM is shifted into a different information processing terminal, which makes it difficult for the illegally TPM-mounted information processing terminal to fulfill the functions of the TPM.

For example, the following patent document 1 discloses a technique of employing an encryption characteristic of a TPM for securing a boot-up process in a computer system, and the following patent document 2 discloses a technique of authenticating the owner having the legal authority of use by using initial data encrypted in a TPM.

In the TPM, at the setting thereof, a unique user key is generated on the basis of a core cipher key for each user using that information processing terminal, and this user key is encrypted with the core cipher key. Moreover, the generated user key is kept in a hard disk of the information processing terminal.

FIGS. 9A and 9B are illustrations for explaining the functions of the TPM. FIG. 9A is an illustration of a log-in technique to an information processing terminal in the case of no use of the functions of the TPM, and FIG. 9B is an illustration of a log-in technique to an information processing terminal in a case in which a log-in authentication is made by using the functions of the TPM.

In the information processing terminal, each user can carry out file encryption, electronic signature, log-in authentication to a terminal and others by using the user key and, for example, in a case in which the log-in to an information processing terminal is made without using the functions of the TPM, the user inputs a password ("aaa" in the example shown in FIG. 9A) for terminal log-in, set in advance, through the use of a keyboard (not shown) or the like as shown in FIG. 9A. Moreover, the information processing terminal conducts the processing such as user log-in authentication by using the terminal log-in password "aaa" inputted thereto.

On the other hand, as shown in FIG. 9B, in the case of use of the functions of the TPM, a terminal log-in password ("aaa" in the example shown in FIG. 9B) is encrypted in advance through the use of a user key and the user inputs a password ("bbb" in the example shown in FIG. 9B) for the use of the TPM through a keyboard or the like.

In addition, in the information processing apparatus, the TPM decrypts the terminal log-in password "aaa" by using this inputted password "bbb" and carries out the processing such as log-in authentication by use of the decrypted password "aaa". As described above, in the case of the use of the TPM, the log-in authentication is made with higher security.

FIG. 10 is an illustration for explaining decryption data in the TPM.

Meanwhile, at the start of use of the TPM (at the initial setting), as shown in FIG. 10, for providing for the breakage of the TPM and others, archive and token which are data for restoration are generated, and a password (token password) is set with respect to this token.

In this case, the archive is backup file data for managing user information related to the TPM and is updated in the case of an increase/decrease in users using the TPM or a change of the password. Concretely, the user information related to the TPM includes, for example, a user ID, a user key, a password for the user key, and other information.

Moreover, in a conventional security management system, the archive is held in a hard disk or the like and, preferably, this archive is separately backed up regularly into an external storage medium.

The token is a cipher key related to the archive, and the archive is subjected to the encryption processing on the basis of this token. Moreover, for the use of the token, there is a need to use a password previously set in correspondence with this token. This enables the unauthorized use to be suppressed even in a case in which an external storage medium storing the token is stolen or in other cases. Moreover, so far, the token is kept in an external storage medium of an information processing terminal (or an external storage unit).

In the case of the loss of the token, the token can again be produced only when the TPM is newly reset and, preferably, the archive and the token are made to be unique to each information processing terminal for security.

Meanwhile, in a conventional information processing terminal equipped with a TPM and protected by encrypting the information in a hard disk through the use of this TPM or by monitoring the apparatus configuration, if the TPM is broken by any possibility, difficulty is experienced in using this information processing apparatus continuously.

Accordingly, the information processing terminal is returned to a state before the breakage of the TPM in a manner such that the broken TPM is replaced with a normal one (including the replacement in units of mother boards) and the original user information in the TPM is restored by using the archive and the token.

Referring to a flow chart (steps A10 to A100) of FIG. 11, a description will be given hereinbelow of a conventional method of restoring user information in a security management system.

The user information restoring method shown in the flow chart of FIG. 11 relates to an example of the restoration of user information in a TPM, i.e., a user ID, a user key, a password and others, and is carried out, for example, in a case in which the TPM in the information processing terminal is replaced with new one because of being broken to be placed into an unusable condition or when the data in the hard disk of the information processing terminal is duplicated and the data fully identical thereto is constructed (produced) in a different information processing terminal.

Let it be assumed that the archive is held in a hard disk of an information processing terminal while the token is stored in an external storage medium such as CD-ROM and the hard disk of the information processing terminal is in a non-replaced condition.

First of all, for making the TPM available, the TPM is changed to a use-permitted condition through the BIOS setting (activation) (step A10).

An operator of the information processing terminal (terminal manager) carries out the log-in to this information processing terminal on the basis of the manager authority, and the terminal manager again inputs a password. The information processing terminal confirms the legality of the operator because the log-in has been made legally on the basis of the manager authority, and resumes the re-construction of a terminal manager environment (step A20).

As a result of the conformation as to whether or not the operator is an illegal terminal manager, in a case in which the information processing terminal makes a judgment that the operator is an illegal terminal manager, for example, because the terminal manager does not input a correct password (see YES route from step A30), an error display or the like is made on a display unit of the information processing terminal (step A100). Then, the processing comes to an end.

On the other hand, if the information processing terminal makes a judgment that it is a legal or proper terminal manager (see NO route from step A30), the information processing terminal carries out a user information restoration process (step A40). The information processing terminal calls an archive and a token needed for the user information restoration process.

In this case, the archive is acquired from a hard disk of the information processing terminal, or the like, while the token is obtained from an external storage medium such as CD-ROM. The terminal manager further inputs a password for the use of the token, and the information processing terminal confirms whether or not the inputted password for the token is correct, thereby checking the legality of the user (terminal manager) of the token (step A50).

As a result of the confirmation as to whether or not the operator is an illegal terminal manager (step A60), when the information processing terminal makes a judgment that the operator is an illegal terminal manager (see YES route from step A60), the operational flow moves to the step A100. Moreover, in a case in which the information processing terminal makes a judgment that it is not an illegal terminal manager (see NO route from step A60), the password of the user is inputted (re-inputted) for the restoration of the environment (user environment) for each user (step A70).

The information processing terminal confirms the legality of the user on the basis of the password inputted by the user (step A80) and, if the judgment shows that the user is an illegal user (see YES route from step A80), the operational flow goes to the step A100. On the other hand, if the judgment indicates that the user is an legal user (see NO route from step A80), The user environment related to the user is re-constructed (step A90). Thereafter, the processing comes to an end.

Furthermore, in a case in which a plurality of information processing terminals carry out the replacement of the TPM or mother board, the above-mentioned restoration processing is conducted with respect to all the plurality of information processing terminals.

Patent Document 1: Japanese Patent Laid-Open No. 2006-092533

Patent Document 2: Japanese Patent Laid-Open No. 2004-282391

However, as mentioned above, it is preferable that the archive and the token are unique to each information processing terminal for security, and there exist the archives and the tokens corresponding in number to the information processing terminals.

This creates a problem to the terminal manager in that the number of archives which are an object of backup and the number of tokens to be managed increases with an increase in the number of information processing terminals which manage them, which leads to complicatedness. For example, if the information processing terminals are some hundreds in number, the tokens and archives to be kept are some hundreds in number, and it is troublesome to keep all some hundreds of tokens in external mediums and carry out these external mediums whenever the maintenance operation takes place, which is an impractical manner. Moreover, from the viewpoint of security, it is undesirable that a maintenance worker carries the token.

In addition, the token and the archive are basically made to be used at only the maintenance operation and the frequency of use is low and, in the case of the management by the retention in an external medium or the like, there is a possibility that it gets lost. Moreover, the password for the use of the token may also fall into oblivion.

Still additionally, there occurs a problem in that, if the token or the archive gets lost or if the password for the use of the token falls into oblivion, the restoration of the original user information in the TPM becomes impossible.

Although it is also considerable that, for reducing the troublesomeness of management, a password for the use of the token is not set (used) so as to eliminate the need for the management of the password, in the case of no setting of password, there is a problem in that difficulty is encountered in coping with conduct such as the illegal duplication of the token, which lowers the security level.

Yet additionally, there is a problem which arises with the conventional security management method in that, since the token is stored in an external medium such as CD-ROM, difficulty is experienced in managing and grasping the token using situation and measures cannot be taken to confirm the possible illegal use of the token.

SUMMARY OF THE INVENTION

The present invention has been developed in consideration of the above-mentioned problems, and it is therefore an object of the invention to reduce the man-hour to be taken by a terminal manager for the management of token, archive and password for the token and to manage a situation of use of the token.

For this purpose, in accordance with the present invention, there is provided a management system comprising a terminal apparatus having a security function module with a cipher processing function and a management apparatus connected to the terminal apparatus to be communicable therewith, wherein the management apparatus includes a storage unit for storing information specifying the terminal apparatus and a restoration user information file cipher key related to the security function module in a state associated with each other and a transmission unit for transmitting the restoration user information file cipher key to the terminal apparatus in response to a calling request from the terminal apparatus for the restoration user information file cipher key, and the terminal apparatus includes a restoration unit for restoring user security information related to the security function module on the basis of the restoration user information file cipher key transmitted from the transmission unit of the management apparatus and a restoration user information file related to the security function module.

In this case, it is also appropriate that the management apparatus further includes a history management unit for managing a transmission history of the restoration user information file cipher key from the transmission unit.

In addition, it is also appropriate that the management apparatus includes a restoration user information file cipher key authentication unit for making an authentication on acquisition of the restoration user information file cipher key so that, when the authentication on the acquisition of the restoration user information file cipher key is made by the restoration user information file cipher key authentication unit, the transmission unit transmits the restoration user information file cipher key.

Still additionally, it is also appropriate that the authentication on the acquisition of the restoration user information file cipher key is made with respect to persons with authority and, when a plurality of persons of the persons with authority make the authentication on the acquisition of the restoration user information file cipher key in the restoration user information file cipher key authentication unit of the management apparatus, the transmission unit transmits the restoration user information file cipher key.

Yet additionally, it is also appropriate that the management apparatus makes the management in a state where a password related to the restoration user information file cipher key is associated with the information specifying the terminal apparatus, and the transmission unit notifies the password to the terminal apparatus in response to a request from the terminal apparatus for acquisition of the password.

Moreover, it is also appropriate that the management apparatus includes a password authentication unit for making an authentication on the acquisition of the password and, when the authentication on the acquisition of the password is made by the password authentication unit, the transmission unit notifies the password.

Still moreover, it is also appropriate that the authentication on the acquisition of the password is made with respect to persons with authority and, when a plurality of persons of the persons with authority make the authentication on the acquisition of the password in the password authentication unit, the transmission unit notifies the password.

Yet moreover, it is also appropriate that the management apparatus makes the management in a state where the restoration user information file related to the security function module provided in the terminal apparatus is associated with the information specifying the terminal apparatus.

Yet moreover, it is also appropriate that the terminal apparatus includes an erase unit for erasing the restoration user information file cipher key transmitted from the transmission unit of the management apparatus after the restoration of the user security information by the restoration unit.

Furthermore, in accordance with the present invention, there is provided a management apparatus communicable with a terminal apparatus having a security function module with a cipher processing function, comprising a storage unit for storing information specifying the terminal apparatus and a restoration user information file cipher key related to the security function module in a state associated with each other and a transmission unit for transmitting the restoration user information file cipher key to the terminal apparatus in response to a calling request from the terminal apparatus for the restoration user information file cipher key.

In this case, it is also appropriate that the management apparatus further comprises a history management unit for managing a transmission history of the restoration user information file cipher key from the transmission unit, or that the management apparatus further includes a restoration user information file cipher key authentication unit for making an authentication on acquisition of the restoration user information file cipher key so that, when the authentication on the acquisition of the restoration user information file cipher key is made by the restoration user information file cipher key authentication unit, the transmission unit transmits the restoration user information file cipher key.

In addition, it is also appropriate that the authentication on the acquisition of the restoration user information file cipher key is made with respect to persons with authority and, when a plurality of persons of the persons with authority make the authentication on the acquisition of the restoration user information file cipher key in the restoration user information file cipher key authentication unit, the transmission unit transmits the restoration user information file cipher key.

Still additionally, it is also appropriate that the management apparatus makes the management in a state where a password related to the restoration user information file cipher key is associated with the information specifying the terminal apparatus, and the transmission unit notifies the password to the terminal apparatus in response to a request from the terminal apparatus for acquisition of the password.

Yet additionally, it is also appropriate that the management apparatus further comprises a password authentication unit for making an authentication on the acquisition of the password and, when the authentication on the acquisition of the password is made by the password authentication unit, the transmission unit notifies the password.

Moreover, it is also appropriate that the authentication on the acquisition of the password is made with respect to persons with authority and, when a plurality of persons of the persons with authority make the authentication on the acquisition of the password in the password authentication unit, the transmission unit notifies the password.

Still moreover, it is also appropriate that the management apparatus makes the management in a state where the restoration user information file related to the security function module provided in the terminal apparatus is associated with the information specifying the terminal apparatus.

Yet moreover, it is also acceptable that the information specifying the terminal apparatus is terminal identification information arbitrarily set in advance with respect to the terminal apparatus.

Yet moreover, it is also acceptable that the information specifying the terminal apparatus is an MAC (media Access Control) address of the terminal apparatus.

Furthermore, in accordance with the present invention, there is provided a management method comprising a storage step of storing information specifying a terminal apparatus having a security function module with a cipher processing function and a restoration user information file cipher key related to the security function module in a state associated with each other, a request reception step of receiving a calling request from the terminal apparatus for the restoration user information file cipher key, and a transmission step of transmitting the restoration user information file cipher key to the terminal apparatus in response to the calling request received in the request reception step.

The present invention can provide at least one of the following effects/advantages.

(1) In the management apparatus, the information specifying the terminal apparatus and the restoration user information file cipher key related to the security function module are stored in a state associated with each other and the restoration user information file cipher key is transmitted to the terminal apparatus in accordance with a calling request from the terminal apparatus, which can improve the secrecy and reliability and provide high convenience without causing the loss of the restoration user information file cipher key.

(2) Even in a case in which a large number of terminal apparatuses exist, it is possible to facilitate the management of the restoration user information file keys of the terminal apparatuses, and others.

(3) At the maintenance operation of the terminal apparatus, the restoration user information file cipher key is not transferred to a maintenance worker, which further improves the secrecy and reliability.

(4) To the maintenance worker or the terminal manager, it is possible to reduce the burden of the keeping and management of the restoration user information file cipher key, the restoration user information file and the password.

(5) By managing the transmission history of the restoration user information file cipher key, it is possible to ensure the management of the restoration user information file cipher key and others and to manage and seize the use situation of the restoration user information file cipher key and others, which enables controlling and preventing the illegal use and duplication of a token and others.

(6) In a case in which an authentication is made on the acquisition of the restoration user information file cipher key, the restoration user information file cipher key is transmitted, thereby controlling and preventing the illegal use and duplication of the restoration user information file cipher key.

(7) In a case in which a plurality of persons with authority make an authentication on the acquisition of the restoration user information file cipher key, the restoration user information file cipher key is transmitted to the terminal apparatus, thereby maintaining and improving the security level, which can improve the reliability of the system.

(8) It is possible to prevent the loss of the restoration user information file cipher key or the restoration user information file and to prevent the password from being buried in oblivion, which can improve the secrecy and reliability and provide high convenience.

(9) In the management apparatus, when the authentication is made on the acquisition on the password, the password is notified to the terminal apparatus, thereby enabling the maintenance and enhancement of security level and the improvement of reliability of the system.

(10) The restoration user information file cipher key is erased after the restoration of the user security information so as to prevent the restoration user information file cipher key, restoration user information file and password from being again put to use after the restoration of the user security information, thereby controlling and preventing the illegal use and duplication of a token and others and further improving the secrecy and reliability.

BRIEF DESCRIPTION OF THE DRAWINGS

FIG. 8 is an illustrative view showing a configuration of a management system according to a modification of an embodiment of the present invention;

FIGS. 9A and 9B are illustrations for explaining the functions of a TPM;

FIG. 11 is a flowchart for explaining a user information restoration method in a conventional security management system.

DESCRIPTION OF THE PREFERRED EMBODIMENTS

Embodiments of the present invention will be described hereinbelow with reference to the drawings.

Figure 1:
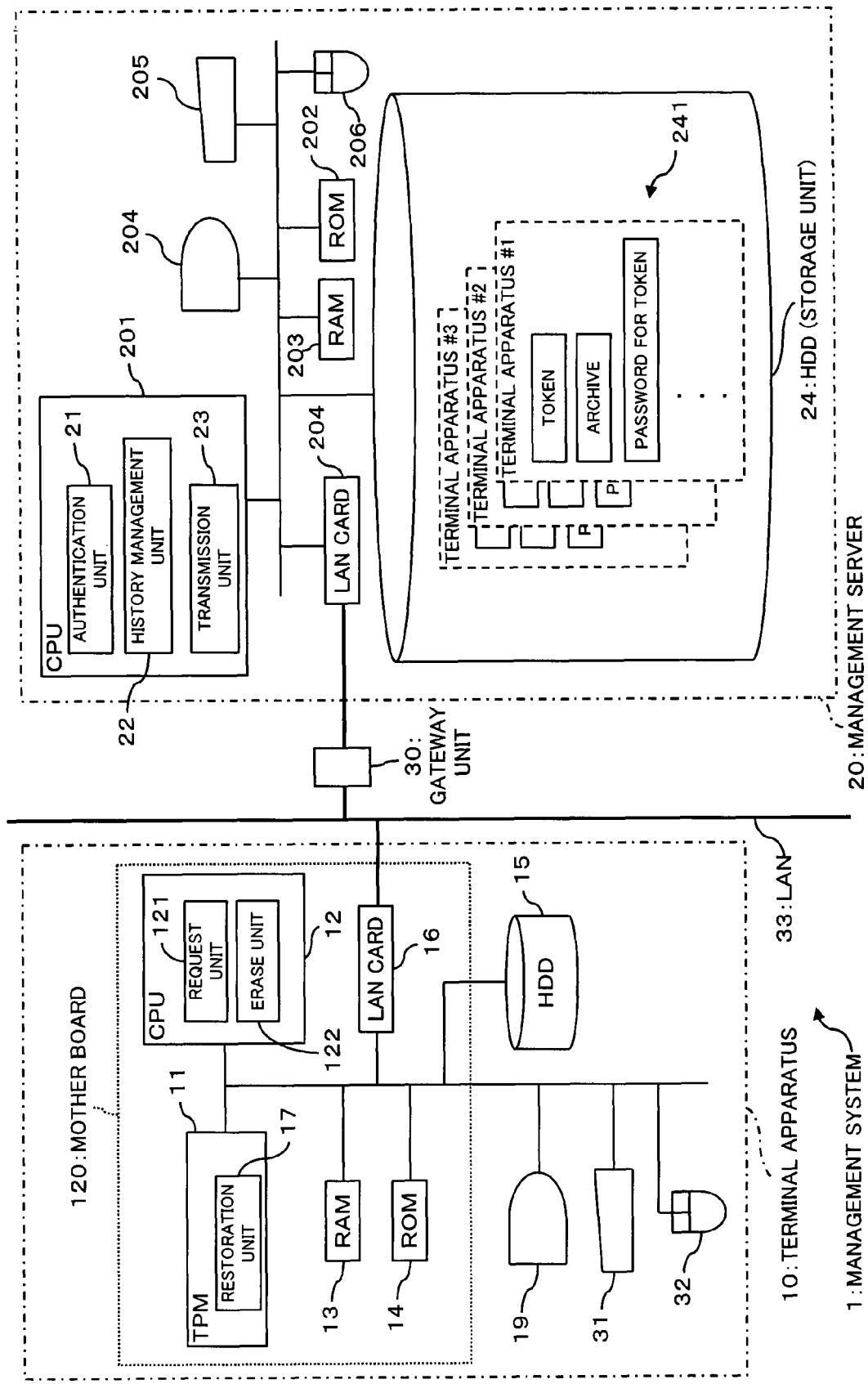
FIG. 1 is an illustrative view showing a configuration of a management system according to an embodiment of the present invention.
Figure 2:
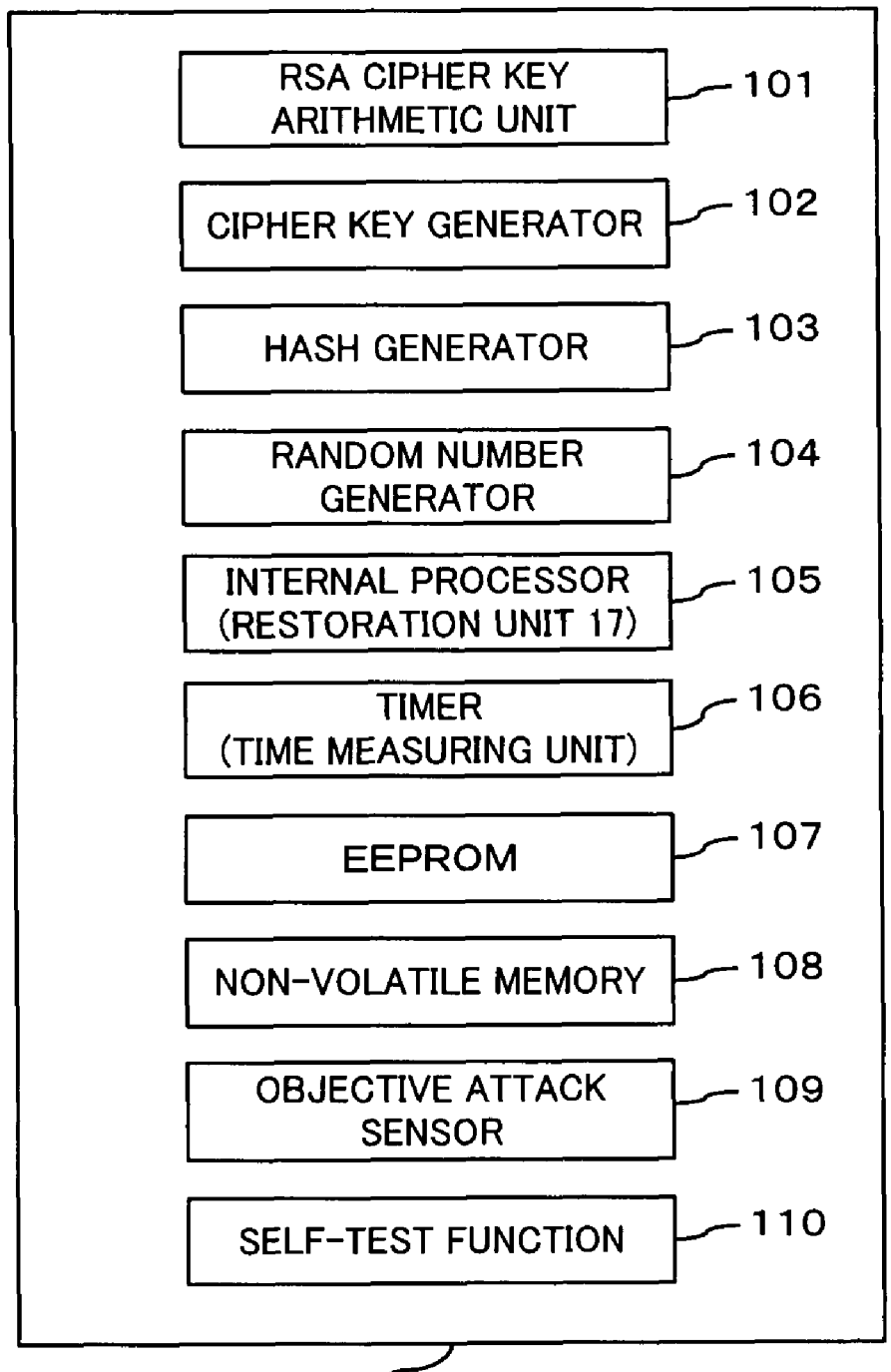
FIG. 2 is an illustrative view showing a configuration of a TPM.

FIG. 1 is an illustrative view showing a configuration of a management system according to an embodiment of the present invention, and FIG. 2 is an illustrative view showing a configuration of a TPM.

As FIG. 1 shows, this management system, generally designated at reference numeral 1, is made up of a terminal apparatus 10 and a management server 20.

The terminal apparatus 10 includes an information processing apparatus (computer) equipped with a TPM (Trusted Platform Module) 11 and, as shown in FIG. 1, it includes the TPM 11, a CPU 12, a RAM 13, a ROM 14, an HDD 15, a display 19, a keyboard 31, a mouse 32 and a LAN card 16 and is connected through a LAN 33 to the management server 20, described later, to be communicable therewith.

Incidentally, for convenience only, FIG. 1 shows an example in which one terminal apparatus 10 is provided in this management system 1, and the following description will be given with respect to one terminal apparatus 10. However, this does not affect the universality of the configuration of the management system 1. Preferably, the management system is equipped with a plurality of terminal apparatuses 10.

The TPM (security function module) 11 is a security chip having a cipher processing function and, for example, is packaged in a mother board 120 and, as shown in FIG. 2, includes an RSA cipher key arithmetic unit 101, a cipher key generator 102, a hash generator 103, a random number generator 104, an internal processor 105, a timer (time measuring unit) 106, an EEPROM 107 and a non-volatile memory 108.

The RSA cipher key arithmetic unit 101 is for carrying out the arithmetic operations on an RSA cipher key, and the cipher key generator 102 is for generating an RSA cipher key. The hash generator 103 is for generating a hash value through the use of a hash function such as SHA-1.

The random number generator 104 is for generating a random number, and the internal processor 105 is for carrying out various arithmetic operations. The timer (time measuring unit) 106 is for measuring time, and the EEPROM 107 is for storing data temporarily.

The non-volatile memory 108 is for storing data and programs, and it is made to maintain the storage contents even in the case of the stop of power supply. This non-volatile memory 108 stores a unique cipher key (core cipher key) set in advance for the TPM 11, and the core cipher key stored in the non-volatile memory 108 is designed in a hardware-like manner so as to inhibit the fetching to the external.

Moreover, this non-volatile memory 108 is made to store user security information related to the TPM 11. This user security information includes, for example, a user ID, a user key, a password for the user key, and others.

Still moreover, in the TPM 11, at the start of use thereof (at the initial setting), an archive and a token which are data for restoration are generated and a password (token password) for this token is set, for providing for the breakage and others of the TPM 11.

The archive (restoration user information file, backup archive) is backup file data for managing an environment (user security information) related to the TPM 11 and is updated at any time, for example, in a case in which the number of users using the TPM 11 increases or when a change of the password takes place. Moreover, the user security information related to the TPM 11 is, for example, a user ID, a user key, a password for the user key, or the like.

The token (restoration user information file cipher key) is a cipher key for the above-mentioned archive, and the archive is encrypted by using this token. Moreover, for the use of the token, there is a need to use a password (password for token) set in advance in correspondence with this token.

In the case of the loss of the token, the token can again be produced only when the TPM 11 is newly reset. Moreover, for example, the token and the archive are produced in a manner such that the internal processor 105 of the TPM 11 executes a program stored in the non-volatile memory 108. Still moreover, from the viewpoint of security, preferably, the archive and the token are unique to each terminal apparatus 10.

In addition, in the TPM 11, for example, the internal processor 105 of the TPM 11 carries out a program stored in the non-volatile memory 108, thereby fulfilling a function as a restoration unit 17 to restore an environment (user security information related to the TPM 11) of the TPM 11 by using the above-mentioned token, archive and token password. The function as the restoration unit 17 is realizable by various existing techniques.

Still additionally, for maintaining the security level in a high state, it is desirable that only the terminal manager having a specified authority with respect to the terminal apparatus 10 can restore the user security information related to the TPM 11.

The HDD (Hard Disk Drive) 15 and the ROM (Read Only Memory) 14 are for storing data, programs and others, and the RAM (Random Access Memory) 13 is for temporarily storing data, programs and others to be used for the arithmetic operations in the CPU 12.

The LAN (Local Area Network) card 16 serves as a communication device to make a connection of the terminal apparatus 10 to the LAN 33 for enabling the communication therebetween, and an MAC (Media Access Control) address which is unique identification information is inherently set in this LAN card 16.

The display 19 is, for example, a display unit such as LCD (Liquid Crystal Display) or CRT (Cathode Ray Tube), and is for displaying various information, messages and other information for an operator (user) of the terminal apparatus 10, or other persons.

The keyboard 31 is an inputting device for conducting various inputting operations through the key inputting by the user, and the mouse 32 is a pointing device (inputting device) for various inputting operations and selection operations by the user.

The CPU (Central Processing Unit) 12 is for executing various types of arithmetic operations, and carries out the programs stored in the HDD 15 or the ROM 14 so as to realize various functions and accomplish the functions as a request unit 121 and an erase unit 122.

The request unit 121 is for making a calling request to the management server 20 for a token, an archive and a password for the token and, in a case in which there is a need to restore an environment (user security information) of the TPM 11, for example, in the case of the replacement of the mother board 120, a calling request for a token, an archive and a password for the token which are to be used for this restoration processing is made to the management server 20 which will be mentioned later.

For example, the calling request for a token or an archive from this request unit 121 is realized by activating a utility (program) stored in the HDD 15, the ROM 14 or the like.

Moreover, a token, an archive or a password for the token transmitted from the management server 20 in response to a calling request from this request unit 121 is temporarily stored in the HDD 15 or RAM 13 of the terminal apparatus 10.

The erase unit 122 is for erasing a token, an archive or a password for the token transmitted from the transmission unit 23 of the management server 20 and temporarily stored in the HDD 15, the RAM 13 or the like after the user security information is restored by the restoration unit 17. This prevents the token, the archive or the password for the token from being again used after the restoration of the user security information by the restoration unit 17.

The erasing of the token, the archive or the password for the token by the erase 122 is realized, for example, in a manner such that the CPU 12 executes a program stored in the HDD 15, and it is realizable by various types of existing techniques.

For example, for the erasing of the token, the archive or the password for the token temporarily preserved in the HDD 15, the RAM 13 or the like, the erase unit 122 is designed to erase the data wholly instead of merely erasing only a portion of the data, such as erasing only an address portion of the data which is an object of erasing, for placing the data into readout-impossible state. This erases the token, the archive or the password for the token up to a data restoration-impossible state through the use of a technique such as directly writing (painting out) "1" or "0" so as to overwrite the data wholly.

Moreover, the erase unit 122 is designed to erase, of a token, a password for the token and an archive generated/set at the start of use (initial setting) of the TPM 11 or the like in the terminal apparatus 10, at least the token and the password for the token in the terminal apparatus 10.

Still moreover, in the terminal apparatus 10, the token, the password for the token and the archive generated/set at the start of use (initial setting) of the TPM 11 or the like are transmitted to the management server 20 and, in this case, the token, the password for the token and the archive are not retained in the terminal apparatus 10 or in an external storage medium such as CD-ROM.

Yet moreover, a unique terminal ID is set in advance with respect to the terminal apparatus 10. This terminal ID is terminal identification information set arbitrarily with respect to the terminal apparatus 10 and is retained in, for example, the HDD 15 or the like.

In the terminal apparatus (information processing apparatus) 10, the CPU 12 functions as the above-mentioned request unit 121 and erase unit 122 by executing a management program.

The program (management program) for realizing the functions as the request unit 121 and the erase unit 122 is offered in a state recorded in, for example, a computer-readable recording medium such as a flexible disk, a CD (CD-ROM, CD-R, CD-RW, or the like), a DVD (DVD-ROM, DVD-RAM, DVD-R, DVD+R, DVD-RW, DVD+RW, or the like), a magnetic disk, an optical disk, a magneto optical disk. Moreover, for use, the computer reads out the program from this recording medium and transfers it to an internal storage unit or external storage unit to put it therein. Still moreover, it is also acceptable that the program is recorded in a storage unit (recording medium) such as a magnetic disk, an optical disk or a magneto optical disk and is offered from this storage unit through a communication line to a computer.

For the realization of the functions such as request unit 121 and the erase unit 122, the program stored in an internal storage unit (RAM 13 or ROM 14) is executed by a microprocessor (in this embodiment, CPU 12) of the computer. At this time, it is also appropriate that the computer reads out and executes the program stored in a recording medium.

In this embodiment, the computer is the concept containing a hardware and an operating system, and signifies the hardware which operates under control of the operating system. Moreover, in a case in which the operating system is unnecessary and an application program operates the hardware by itself, the hardware itself corresponds to the computer. The hardware includes at least a microprocessor such as a CPU and a means for reading out a computer program stored in a recording medium and, in this embodiment, the terminal apparatus 10 has a function as the computer.

Moreover, combined with the above-mentioned flexible disk, CD, DVD, magnetic disk, optical disk and magneto optical disk, the recording medium in this embodiment can include an IC card, a ROM cartridge, a magnetic tape, a punch card, an internal storage unit (memory such as RAM or ROM), an external storage unit and others, and can further include various types of mediums such as code (bar-code or the like) printed matters readable by a computer.

The management server (management apparatus 20) is an information processing apparatus (computer, server computer) composed of a CPU 201 (authentication unit 21, history management unit 22, transmission unit 23), a ROM 202, a RAM 203, an HDD 24 and a LAN card 204. Moreover, this management server 20 is connected through a gateway unit 30 to a LAN (Local Area Network) 33 to be communicable therewith, so it is communicable with the terminal apparatus 10 through the LAN 33.

The CPU (Central Processing Unit) 201 is for carrying out various types arithmetic operations, and realizes various types of functions by executing programs stored in the HDD 24 and the ROM 202, thereby realizing the functions as an authentication unit 21, a history management unit 22 and a transmission unit 23, which will be described later.

The HDD (Hard Disk Drive) 24 and the ROM (Read Only Memory) 202 are for storing data, programs and others, and the RAM (Random Access Memory) 203 is for temporarily storing data, programs and others to be used for arithmetic operations in the CPU 201.

The LAN (Local Area Network) card 204 is a communication device for making a connection of the management server 20 to the LAN 33 so that they are communicable with each other.

The CPU 201 is designed to carry out various types of arithmetic operations and to realize various types of functions by executing programs stored in the HDD 24 or the ROM 202, thereby realizing the functions as the authentication unit 21, the history management unit 22 and the transmission unit 23.

The display 204 is, for example, a display unit such as an LCD (Liquid Crystal Display) or CRT (Cathode Ray Tube), and is made to display various information and messages to an operator and others.

The keyboard 205 is an inputting device for conducting various inputting operations through the key inputting by an operator, and the mouse 206 is a pointing device (inputting device) for various inputting operations by the operator.

Figure 3:
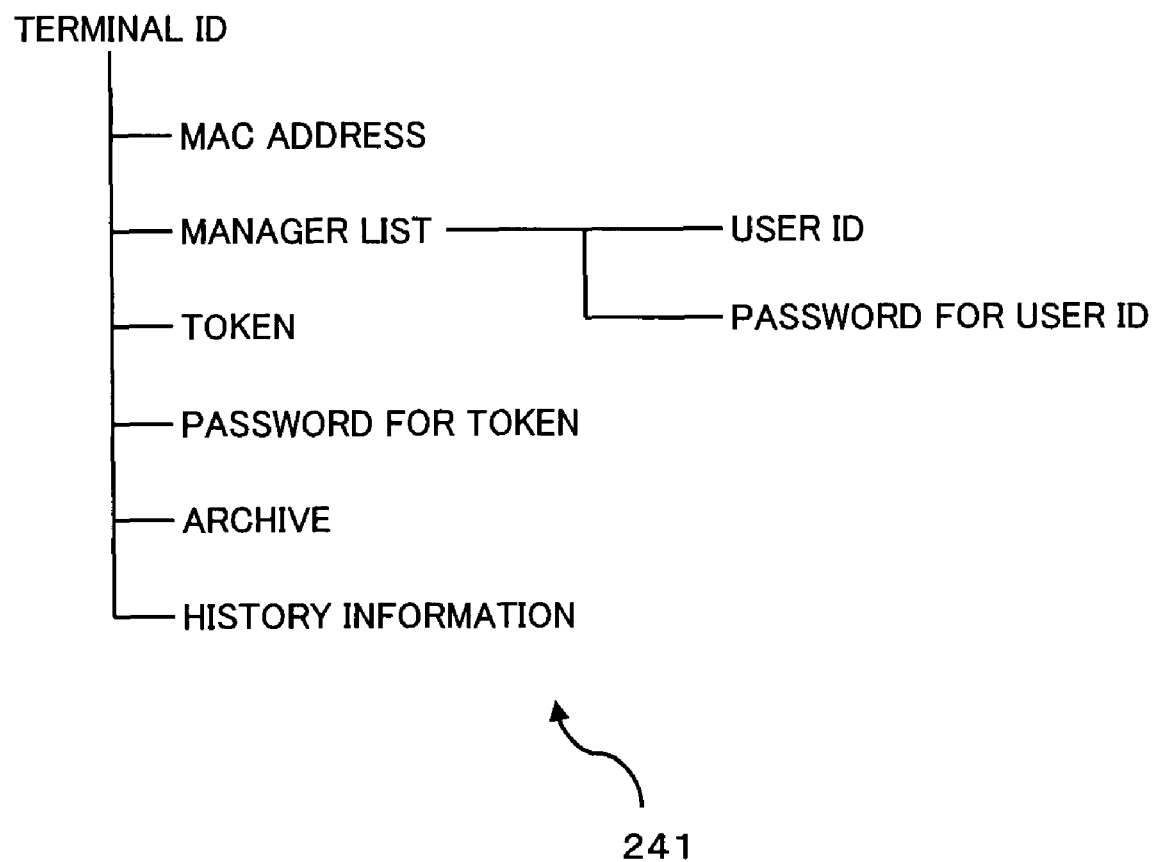
FIG. 3 is an illustrative view showing an example of management information to be managed by a management server in a management system according to an embodiment of the present invention.

The HDD (storage unit) 24 is made to store management information 241 as shown in FIG. 3.

FIG. 3 is an illustrative view showing an example of the management information to be managed by the management server 20 in the management system according to an embodiment of the present invention. As shown in FIG. 3, the management information 241 is constructed in a manner such that an MAC address, a manager list, a token, a password for the token, an archive and history information are associated with a terminal ID.

As mentioned above, the terminal ID is terminal identification information arbitrarily set with respect to the terminal apparatus 10, and the MAC address is unique identification information set in the LAN card 16 of the terminal apparatus 10, with these terminal ID and MAC address being used as information specifying the terminal apparatus 10.

In other words, the management information 241 is arranged in a state where the terminal ID, the MAC address, the manager list, the token, the password for the token, the archive and the history information are associated for each terminal apparatus 10.

Each of the token, the password for the token and the archive in the management information 241 is actually each of a token, password for the token and archive related to the TPM 11 of the terminal apparatus 10 specified by the terminal ID, or it is information for specifying a storage position thereof.

When the token, the password for the token and the archive are generated/set at the start of use (initial setting) of the TPM 11 in the terminal apparatus 10, they are transmitted from the terminal apparatus 10 through the LAN 33 or the like to the management server 20 and stored in, for example, the HDD 24 of the management server 20 to be intensively managed in the management server 20.

The management list is information on a terminal manager of the terminal apparatus 10 and, for example, as shown in FIG. 3, it is registered in a state where a user ID of a legal terminal manager with a specified authority (for example, the authority of use of the terminal apparatus 10) is previously associated with a password (password for user ID) corresponding to this user ID. Moreover, in a case in which a specified authority on the terminal apparatus 10 is given to a plurality of terminal managers, the user IDs and passwords of all the terminal managers are registered as a manager list.

The history information is a transmission history on a token, an archive and a token password from the transmission unit 23 (which will be mentioned in detail later) to the terminal apparatus 10. As this history information, for example, there are the date of a calling request, the date of the transmission of the token, the archive and the token password, a terminal ID and MAC address of a terminal which has transmitted the calling request, a user ID of a user who has made an authentication, and other information.

In addition, in this management system 1, the MAC address notified from the terminal apparatus 10 is also retained as the history information and, for example, in a case in which the MAC address of the terminal apparatus 10 is changed due to the replacement of the LAN card 16 or the like, the history of the change (the respective MAC addresses before and after the change) is preserved as a list.

These history information are produced by the history management unit 22 and stored in the HDD 24. Moreover, the history information is not limited to the above-mentioned transmission history such as a token and the MAC address of the terminal apparatus 10, but it is also acceptable to preserve, in addition to these information, for example, the information (date and user ID) on a calling request transmitted from the terminal apparatus 10.

The history management unit 22 manages and preserves the transmission history on the token, the archive and the password for the token, and others, from the transmission unit 23 to the terminal apparatus 10 as the history information in the management information 241.

The authentication unit (restoration user information file cipher key authentication unit, restoration user information file authentication unit, password authentication unit) 21 carries out the user authentication on the basis of the user ID and the user ID password in the manager list when the request unit 121 of the terminal apparatus 10 issues a calling request for the token, the archive and the token password.

That is, when the request unit 121 of the terminal apparatus 10 issues a calling request for the token, the authentication unit 21 functions as the restoration user information file cipher key authentication unit to make a user authentication on the basis of the user ID and the user ID password in the manager list and, when the request unit 121 of the terminal apparatus 10 issues a calling request for the archive, the authentication unit 21 functions as the restoration user information file authentication unit to make a user authentication on the basis of the user ID and the user ID password in the manager list. Moreover, in the case of a calling request for the token password, the authentication unit 21 functions as the password authentication unit to make a user authentication on the basis of the user ID and the user ID password in the manager list.

Furthermore, in this embodiment, the management server 20 manages and preserves the token, the archive and the token password in the HDD 24 in a centralized manner and, hence, it can authenticate the calling request for these token, archive and token password from the request unit 121 of the terminal apparatus 10 by one-time user authentication.

Still furthermore, the CPU 201 of the management server (information processing apparatus) 20 fulfills the above-mentioned functions as the authentication unit 21, the history management unit 22 and the transmission unit 23 by carrying out the management program.

The programs (management program) for realizing the functions as the authentication unit 21, the history management unit 22 and the transmission unit 23 are effected in a state recorded in, for example, a computer-readable recording medium such as a flexible disk, a CD, a DVD, a magnetic disk, an optical disk or a magneto optical disk. For use, the computer reads out the program from this recording medium and transfers it to an internal storage unit or external storage unit for storing it therein. Moreover, it is also appropriate that the program is first stored in, for example, a storage unit (recording medium) such as a magnetic disk, an optical disk or a magneto optical disk and then offered from the storage unit through a communication line to the computer.

For realizing the functions as the authentication unit 21, the history management unit 22 and the transmission unit 23, the program stored in the internal storage unit (RAM 203 or ROM 202) is executed by a microprocessor (in this embodiment, CPU 201) of the computer. In this case, it is also appropriate that the program stored in the recording medium is read out and executed by the computer.

In this embodiment, the computer is a concept containing a hardware and an operating system and signifies the hardware which operates under control of the operating system. Moreover, in a case in which the operating system is unnecessary and an application program operates the hardware by itself, the hardware itself corresponds to the computer. The hardware includes at least a microprocessor such as a CPU and a means for reading out a computer program stored in a recording medium and, in this embodiment, the management server 20 has a function as the computer.

Moreover, combined with the above-mentioned flexible disk, CD, DVD, magnetic disk, optical disk and magneto optical disk, the recording medium in this embodiment can include an IC card, a ROM cartridge, a magnetic tape, a punch card, an internal storage unit (memory such as RAM or ROM), an external storage unit and others, and can further include various types of mediums such as code (bar-code or the like) printed matters readable by a computer.

Figure 4:
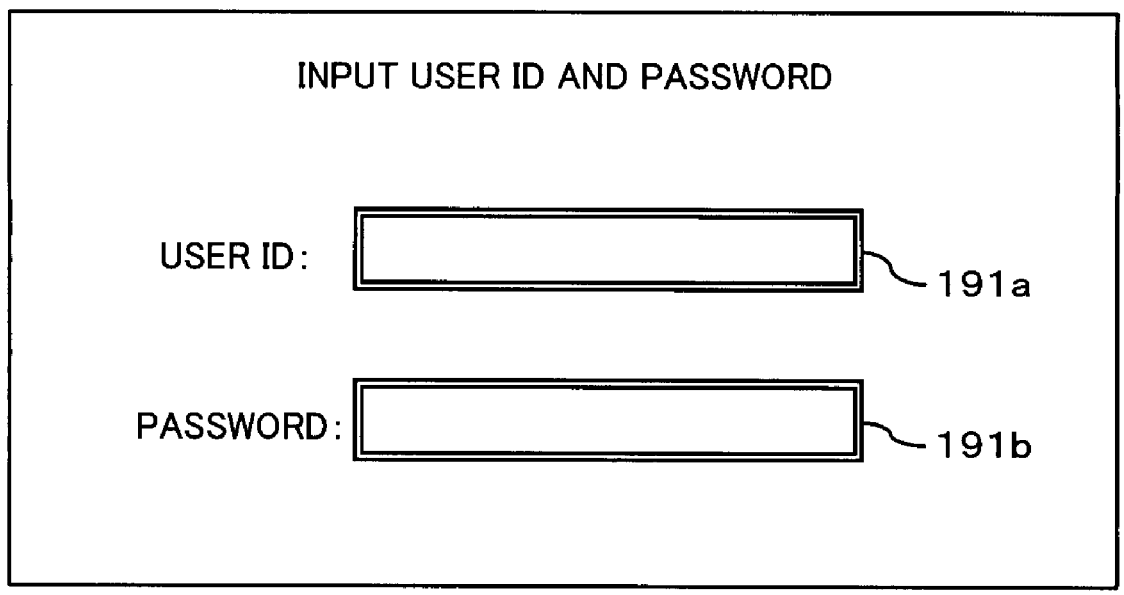
FIG. 4 is an illustration of an example of a user authentication screen in a management system according to an embodiment of the present invention.

FIG. 4 is an illustration of an example of a user authentication screen in the management system 1 according to an embodiment of the present invention.

In this management system 1, when a calling request for a token, an archive or a token password takes place, the authentication unit 21 makes the display 19 of the terminal apparatus 10 show a user authentication screen 191 shown in FIG. 4.

As shown in FIG. 4, the user authentication screen 191 includes a user ID inputting section 191a for inputting a user ID and a password inputting section 191b for inputting a password and, in the user ID inputting section 191a and the password inputting section 191b of this user authentication screen 191, an operator (terminal manager, user) of the terminal apparatus 10 inputs a user ID and a password previously set in correspondence with this user ID through the use of the keyboard 31 or the mouse 32.

In this connection, the screen data for putting the user authentication screen 191 on the display 19 can be provided on both the terminal apparatus 10 side and the management server 20 side and further it can also be provided in external devices (not shown) of the terminal apparatus 10 and the management server 20.

The authentication unit 21 is made to carry out the authentication on a person with authority, and it acquires the user ID and the password inputted in the above-mentioned user authentication screen 191 to make a comparison between the inputted user ID and password and the user ID and user ID password registered in the manager list of the management information 241 on the terminal apparatus 10 and, when the user ID and password inputted in the user authentication screen 191 agree with the user ID and user ID password corresponding to this user ID stored in the management information 241, an authentication is made that the terminal apparatus 10 is operated by a person with a legal authority (terminal manager).

In addition, in response to a calling request for the token or the like from the terminal apparatus 10, the authentication unit 21 is made to acquire the terminal ID and the MAC address from this terminal apparatus 10 and further to specify the terminal apparatus 10 on the basis of these terminal ID and MAC address.

Concretely, the authentication unit 21 makes a judgment as to whether each of the terminal ID and MAC address acquired from the terminal apparatus 10 agrees with the management information 241 in the HDD 24, thus specifying the terminal apparatus 10.

As described above, the terminal apparatus 10 is specified on the basis of not only the terminal ID but also the MAC address which is the identification information unique to the LAN card 16, which can improve the specifying accuracy (security level) on the terminal apparatus 10.

Moreover, in the terminal apparatus 10, even in a case in which the MAC address is changed since the LAN card 16 is replaced for some reason, the authentication is made by using the terminal ID, the user ID and the user ID password, which can conform the legality of the operator of the terminal apparatus 10 to reliably recognize the terminal apparatus 10.

The transmission unit 23 is made to transmit a token, an archive and a token password to the terminal apparatus 10 in response to a calling request from the terminal apparatus for the token, the archive and the token password and, when a transmission request is received from the terminal apparatus 10 and the authentication unit 21 authenticates that a legal user operates the terminal apparatus 10 (authentication on a person with authority), it transmits these token, archive and token password through the LAN card 204, the gateway unit 30 and the LAN 33 to this terminal apparatus 10.

The gateway unit 30 is a network device for making a connection of the management server 20 to the LAN 33 to allow the communication therebetween and, for example, it is designed to enable the communication by carrying out the mutual conversion on data different in protocol or the like. The existing network devices diversely modified according to the system environment, the hardware configuration and others can be used as the gateway unit 30.

Figure 5:
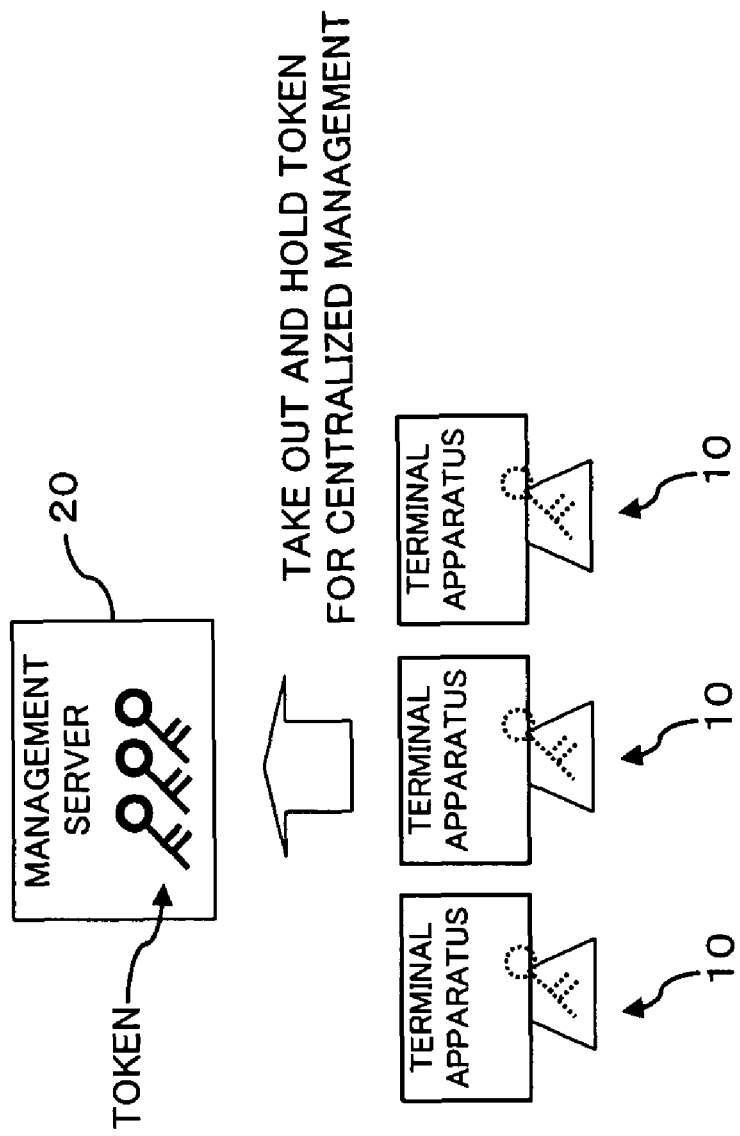
FIG. 5 is an illustration useful for explaining a token management method in a management server of a management system according to an embodiment of the present invention.
Figure 6:
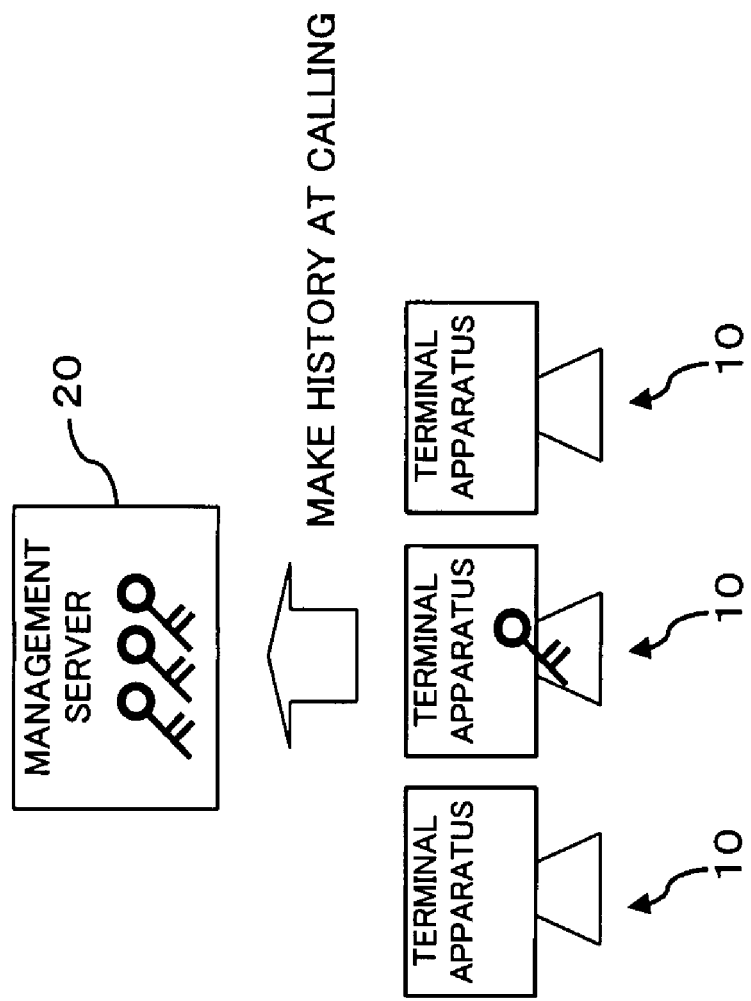
FIG. 6 is an illustration useful for explaining a token management method in a management server of a management system according to an embodiment of the present invention.

FIGS. 5 and 6 are illustrations useful for explaining token management methods in the management server 20 of the management system 1 according to an embodiment of the present invention. FIG. 5 is an illustration for explaining the processing to be conducted when a token is registered from the terminal apparatus 10 into the management server 20, and FIG. 6 is an illustration for explaining the processing to be conducted when the terminal apparatus 10 acquires a token from the management server 20.

In the management system 1 according to the embodiment of the present invention, configured as described above, as shown in FIG. 5, a token, an archive and a token password generated and set at the start of use of the TPM 11 or the like in the terminal apparatus 10 are transmitted from the terminal apparatus 10 to the management server 20 and stored in the HDD 24 of the management server 20 (storage step).

Furthermore, with reference to FIG. 6 and according to a flow chart (steps B10 to B190) of FIG. 7, a description will be given hereinbelow of a method of restoring user information in the management system 1 according to an embodiment of the present invention.

Figure 7:
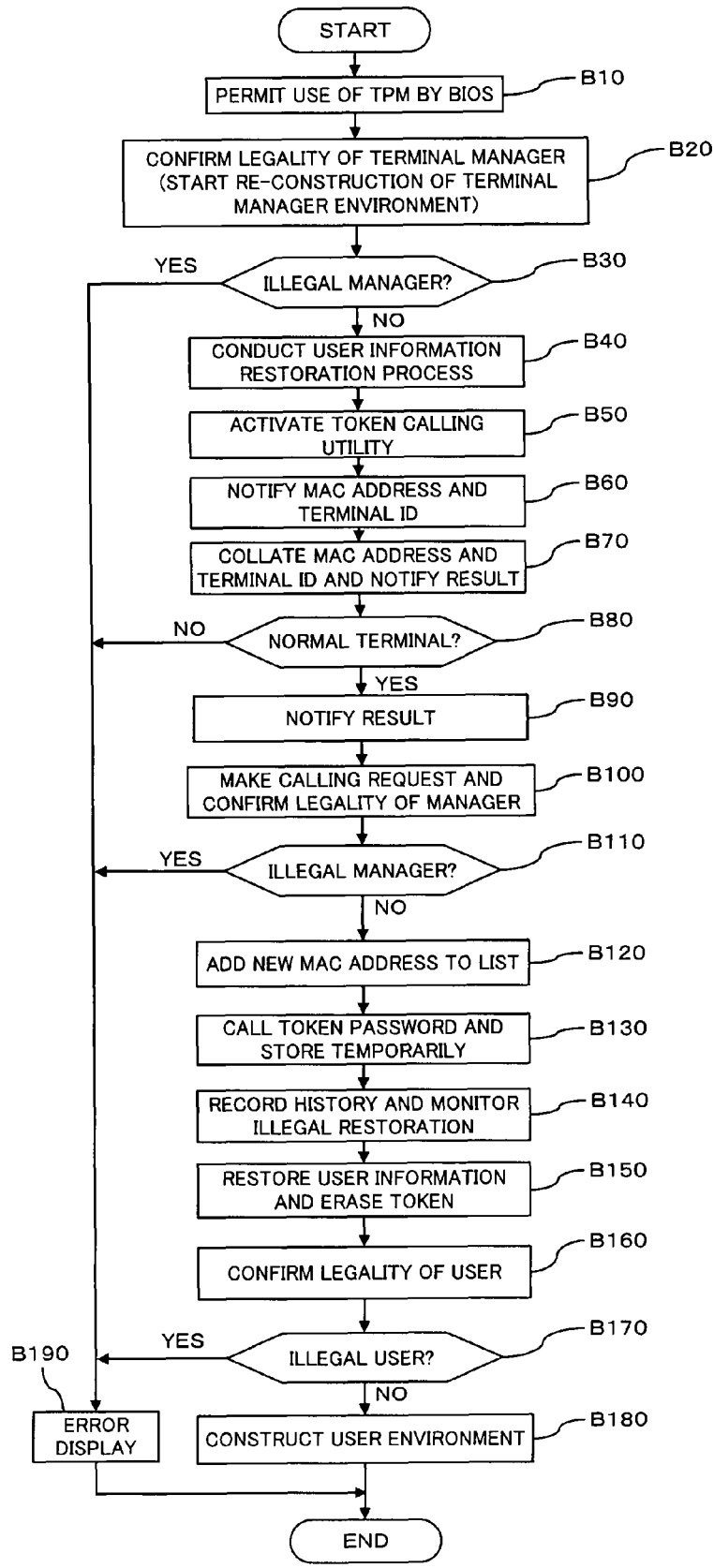
FIG. 7 is a flow chart useful for explaining a user information restoration method in a management system according to an embodiment of the present invention.
Figure 10:
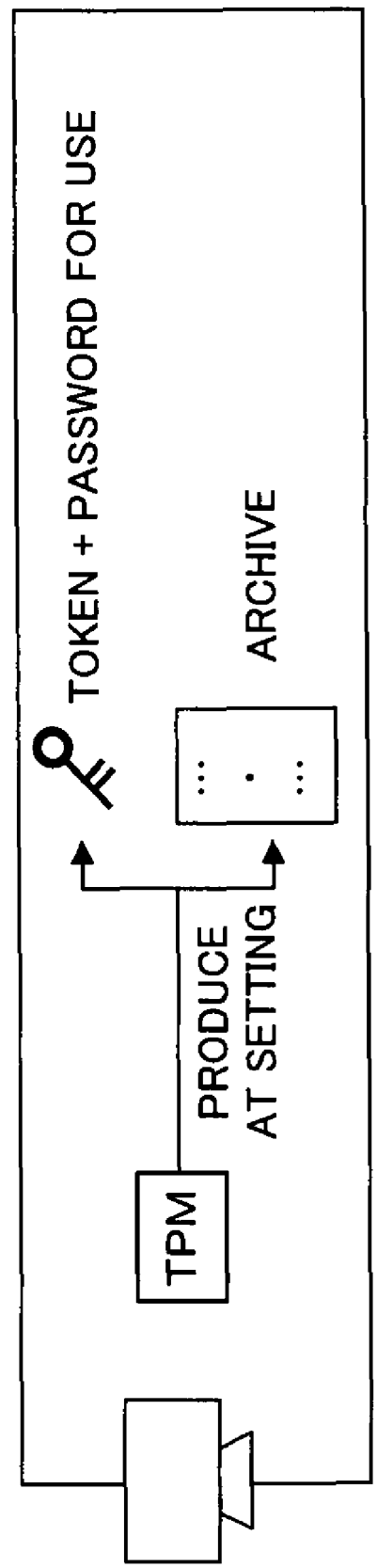
FIG. 10 is an illustration for explaining restoration data in a TPM.

The user information restoration method shown in the flow chart of FIG. 7 relates to an example of restoring user information in the TPM 11, i.e., a user ID, a user key, a password and others and, for example, it is conducted, for example, in a case in which the TPM 11 is broken to be unusable in the terminal apparatus 10 and is replaced with a new printed board (mother board 120 or the like) mounted on the TPM 11, when the data in the hard disk of the terminal apparatus 10 is duplicated so as to construct (produce) the fully identical data in a different terminal apparatus 10 or in other cases. Incidentally, when the TPM 11 is damaged, it is also acceptable that only the TPM 11 is replaced instead of the replacement of the printed board (mother board 120) in entirety.

First of all, for making the TPM 11 usable, the TPM 11 is changed to the usable condition at the BIOS setting (activation) (step B10).

The terminal manager of the terminal apparatus 10 carries out the log-in to the terminal apparatus 10 with the manager authority and inputs the password of the terminal manager. The terminal apparatus 10 confirms the legality of the operator because the log-in has been made legally with the manager authority, and starts the re-construction of the terminal manager environment (step B20). In this case, the terminal apparatus 10 carries out at least the establishment of the connection to the LAN 33.

As a result of the confirmation as to whether or not the operator of the terminal apparatus 10 is an illegal terminal manager (step B30), by reason that the correct password of the terminal manager has not been inputted or for other reasons, when a judgment in the terminal apparatus 10 is made that the operator of the terminal apparatus 10 is an illegal terminal manager (see YES route from step B30), an error display or the like is made on the display 19 of the terminal apparatus 10 (step B190). Following this, the processing comes to an end.

On the other hand, if the operator of the terminal apparatus 10 is a legal terminal manager (see NO route from step B30), the terminal apparatus 10 activates (starts) the user information restoration process (step B40).

In the terminal apparatus 10, the request unit 121 activates the utility for calling a token and an archive needed for the user information restoration process so as to issue a calling request for the token and the archive (step B50). For example, the management server 20 managing the token and the archive is specified by the terminal operator, and the management server 20 storing the token and the archive is designated/inputted through an inputting screen (not shown) or the like put on the display 19 by the utility, thereby designating and inputting the storage positions of these token and archive.

In this connection, it is also appropriate that the information on the management server 20 storing the token and the archive and the storage positions thereof are stored in the non-volatile memory 108 of the TPM 11, the ROM 13 of the terminal apparatus 10 or the like.

In addition, the management server 20 receives this calling request for the token and the archive (request reception step).

The terminal apparatus 10 notifies the MAC address and the terminal ID to the management server 20 (step B60), and in the management server 20, the authentication unit 21 conducts the collation on these MAC address and terminal ID.

Concretely, the authentication unit 21 refers to the management information 241 on the basis of the MAC address transmitted from the terminal apparatus 10 so as to confirm whether or not this MAC address has been registered in the management information 241, and further refers to the management information 241 on the basis of the terminal ID transmitted from the terminal apparatus 10 so as to confirm whether or not this terminal ID has been registered in the management information 241, that is, whether or not it is normal (step B70).

As a result of the confirmation by the authentication unit 21 as to whether the terminal ID is normal or not (step B80), if the authentication unit 21 makes a judgment that the terminal ID is not normal (see NO route from step B80), an error display or the like is made on the display 19 of the terminal apparatus 10 (step B190). Thereafter, the process comes to an end.

On the other hand, if the authentication unit 21 confirms that the terminal apparatus 10 is normal (see YES route from step B80), the management server 20 notifies this judgment to the terminal apparatus 10 (step B90).

The terminal apparatus 10 makes a calling request for a token and an archive to the management server 20 and makes the display 19 show the user authentication screen 191. The terminal manager inputs the user ID and the password for the user ID in this user authentication screen 191.

In the management server 20, the authentication unit 21 refers to the management information 241 on the basis of the inputted user ID and user ID password transmitted from the terminal apparatus 10 so as to confirm whether or not these user ID and user ID password have been registered as the legal person with authority in the management information 241, thereby conforming the legality of the operator (terminal manager) of the terminal apparatus 10 (step B100).

In a case in which, as a result of the confirmation on the legality of the terminal manager (step B110), a judgment is made that the operator of the terminal apparatus 10 is an illegal terminal manager (see YES route from step B110), an error display or the like is made on the display 19 of the terminal apparatus 10 (step B190). Following this, the processing comes to an end.

On the other hand, if the authentication unit 21 makes a judgment that the operator of the terminal apparatus 10 is a legal terminal manager (see NO route from step B100), when the MAC address notified from the terminal apparatus 10 is not registered in the management information 241, the management server 20 registers this MAC address in a state associated with the terminal ID of the terminal apparatus 10 in the management information 241 (step B120). For example, in a case in which the MAC address is changed due to the replacement of the LAN card 16 or the like, this new MAC address is registered in the management information 241.

Moreover, at this time, the authentication unit 21 legally authenticates that this terminal apparatus 10 is normal.

The terminal apparatus 10 calls the token, the archive and the token password from the management server 20, and the transmission unit 23 of the management server 20 transmits the token, the archive and the token password (transmission step). Moreover, the token, the archive and the token password, transmitted, are temporarily stored in the designated memory (ROM 14 or the like) in the terminal apparatus 10 (step B130).

On the other hand, as shown in FIG. 6, the management server 20 records the history on the called token, archive and token password as the history information in the management information 241 to monitor an illegal restoration (step B140).

In the terminal apparatus 10, after the restoration unit 17 of the TPM 11 restores the user information by using the archive, the token and the token password, the erase unit 122 clears the memory which stores the token, the archive and the token password (step B150) and then terminates the utility which is used for calling the token and others. Thus, by clearing the memory storing the token, the archive and the token password, it is possible to prevent the token, the archive and the token password from being preserved in the HDD 15 or an external storage unit (not shown).

Following this, the terminal apparatus 10 carries out the authentication in a user level in place of the terminal manager. That is, the user inputs the user ID and the password in a user authentication screen (see the user authentication screen 191 in FIG. 4) put on the display 19, and the terminal apparatus 10 confirms the legality of the user on the basis of the user ID and password inputted by this user (step B160).

As a result of the confirmation on the legality (step B170), when a judgment is made that the user is an illegal user (see YES route from step B170), the operational flow goes to a step B190. On the other hand, if a judgment is made that the user is a legal user (see NO route from step B170), the user environment is re-constructed (step B180), and the restoration processing comes to an end.

Moreover, in a case in which there are a plurality of terminal apparatus 10 each requiring the replacement of the TPM 11 or the mother board 120, the above-mentioned restoration processing is individually conducted with respect to all the terminal apparatus 10.

Thus, since the management system 1 according to an embodiment of the present invention retains and manages a token in the management server 20, it is possible to not only prevent the loss of the token or the like but also improve the secrecy and reliability and even provide high convenience.

Likewise, by retaining and managing the archive and the token password in the management server 20, it is possible to improve the secrecy and reliability without causing the loss of the archive and the slipping (missing) of the token password and further to provide high convenience.

Furthermore, it is possible to improve the secrecy and reliability without allowing the token to be transferred to a maintenance worker at the maintenance operations of the terminal apparatus 10 (TPM 11).

Still furthermore, to the maintenance worker or the terminal manager, it is possible to reduce the burden of the keeping and management of the token, the archive and the token password. In particular, in a case in which a large number of terminal apparatus 10 exist, the management of the token and others becomes easy.

Since the history management unit 22 manages the transmission history of the token and others to the terminal apparatus 10, it is possible to fully manage the token and others, which enables managing and seizing the using situations of the token and others, thereby managing and preventing the illegal use and duplication of the token and others.

In the management information 241, the terminal ID and the MAC address are used as the information for specifying the terminal apparatus 10, which enables the easy and reliable specification of the terminal apparatus 10. In particular, it is possible to enhance the security level by the management using the terminal ID and the management using the MAC address.

For example, since the authentication unit 21 specifies the terminal apparatus 10 through the use of the MAC address, in a case in which a calling request for a token and others is issued from a different terminal apparatus 10 or in other cases, it is possible to recognize it, and if the MAC address is not registered in the management information 241, it is possible to take guard measures in a hardware level as needed, such as inhibiting the transmission of a token and others.

When the authentication unit 21 carries out the user authentication through the use of a user ID and a password in response to a calling request for a token and others from the terminal apparatus 10, it is possible to manage and prevent the illegal use and duplication of the token and others. Moreover, for example, even in a case in which the motherboard 120 or the LAN card 16 is replaced in the terminal apparatus 10 so that a change of the MAC address takes place in the terminal apparatus 10, by carrying out the user authentication on the terminal manger for confirming the legality of the terminal manager, it is possible to secure the reliability with respect to the calling request for the token and others, maintain and improve the secrecy and reliability, and provide high convenience.

After the restoration of the user security information by the restoration unit 17, the erase unit 122 erases the token, the archive and the token password retained temporarily in the HDD 15, the RAM 13 or the like, which prevents the token, the archive and the token password from being reused after the restoration of the user security information by the restoration 17, thus enabling the management and prevention of the illegal use and duplication of the token and others and the maintenance and improvement of the secrecy and reliability.

It should be understood that the present invention is not limited to the above-described embodiment, and that it is intended to cover all changes and modifications of the embodiment of the invention herein which do not constitute departures from the spirit and scope of the invention.

For example, although in the above-described embodiment the management server 20 retains and manages token, archive and token password, the present invention is not limited to this, but it is also appropriate that the management server 20 manages only the token or only one of the archive and the token password in addition to the token, and it is also possible to make all changes and modifications of the embodiment of the invention herein which do not constitute departures from the spirit and scope of the invention.

The management information 241 is not limited to the example shown in FIG. 3, but it is also acceptable to associate information other than shown in FIG. 3. It is also acceptable to construct the management information 241 excluding a portion of the terminal ID, the MAC address, the management list, the token, the token password, the archive and the history information.

FIG. 8 is an illustrative view showing a configuration of a modification of the management system 1 according to an embodiment of the present invention. In the example shown in FIG. 8, no archive is included in the management information 241, and the archive on the terminal apparatus 10 is stored in the HDD 15 of the terminal apparatus 10. Other sections are designed as well as the management system 1 according to the first embodiment.

In the illustration, the same reference numerals as those used above designate the same or almost same parts, and the description thereof will be omitted for brevity.

Since the archive is updated at all times, for example, in a case in which the number of users who use the TPM 11 increases or decreases or when a change of the password takes place, it is possible to reduce the number of times of communication between the terminal apparatus 10 and the management server 20, or the like, stemming from the updating of the archive by keeping in the HDD 15 of the terminal apparatus 10 as shown in FIG. 7.

Moreover, although in the above-described embodiment the authentication unit 21 authenticates the operation of the terminal apparatus 10 by a legal user in a case in which the user ID and password inputted in the user authentication screen 191 agree with the user ID and user ID password corresponding to this user ID placed in the management information 241 and, when the authentication has been made in this way, the transmission unit 23 transmits the token to the terminal apparatus 10, the present invention is not limited to this, but it is also appropriate that, for example, when a plurality of persons with authority conduct the authentication on the acquisition of the token and others, the transmission unit 23 transmits the token and others.

In this case, the user authentication screen 191 shown in FIG. 4 is put several times on the display 19 of the terminal apparatus 10 and the transmission unit 23 transmits the token and others only when the authentication unit 21 authenticates a plurality of persons, i.e., the input of pluralities of user IDs and user ID passwords.

Thus, when a plurality of persons with authority have conducted the authentication on the acquisition of the token and others, the transmission unit 23 transmits the token and others. This can maintain or enhance the security level and can improve the reliability of the system.

In addition, although in the above-described embodiment the authentication unit 21 refers to the management information 241 on the basis of the user ID and user ID password inputted in the user authentication screen 191 to confirm the registration of these user ID and user ID password in the management information 241 for conforming the legality of the user (manager), the present invention is not limited to this, but it is also appropriate to, for example, conduct the biometrics authentication using biometrics information of the user such as fingerprint, palmprint, vein of palm, vein of finger or iris, and it is also possible to make all changes and modifications of the embodiment of the invention herein which do not constitute departures from the spirit and scope of the invention.

Still additionally, although in the above-described embodiment the management server 20 provided in this management system 1 is one in number for convenience only, the present invention is not limited to this, but it is also possible that the management system 1 is composed of a plurality of management servers 20.

In a case in which a plurality of management servers 20 are provided in the management system 1, the management servers 20 having almost same functions can distributively manage the management information 241 on the terminal apparatus 10 different from each other, and a plurality of management servers 20 can distributively manage the contents of the management information 241, such as managing the archive and the token password in a management server 20 different from the management server 20 which manages the token, and it is also possible to make all changes and modifications of the embodiment of the invention herein which do not constitute departures from the spirit and scope of the invention.

The disclosure of the respective embodiment of the present invention enables the implementation and manufacturing of the present invention by a person skilled in the art.

What is claimed is:

1. A management system comprising a plurality of terminal apparatuses each having a security function module with a cipher processing function and a management apparatus connected to said plurality of terminal apparatuses to be communicable therewith, said management apparatus comprising:
a unit that relates a terminal identifier identifying each terminal apparatus with both a restoration user information file related to the security function module provided in said each terminal apparatus, the restoration user information file being a backup data file to be used for restoring an environment of the corresponding security function module, and a restoration user information file cipher key related to a security function module of said each terminal apparatus;
a storage unit that stores, for all of said plurality of terminal apparatuses, said terminal identifiers, by relating said terminal identifier with respective restoration user information files and respective restoration user information file cipher keys; and a transmission unit that transmits, to one of said plurality of terminal apparatuses, a restoration user information file cipher key corresponding to said one of said plurality of terminal apparatuses in response to a request from said one of said plurality of terminal apparatuses for the restoration user information file cipher key, and transmits, to said one of said plurality of terminal apparatuses, a restoration user information file corresponding to said one of said plurality of terminal apparatuses in response to a second request from said one of said plurality of terminal apparatuses for the restoration user information file, a restoration user information file cipher key authentication unit for making an authentication on acquisition of the restoration user information file cipher key, when the authentication on the acquisition of the restoration user information file cipher key is made by said restoration user information file cipher key authentication unit, said transmission unit transmits the restoration user information file cipher key, and each of said terminal apparatuses comprising a restoration unit that restores user security information related to said security function module on the basis of the restoration user information file cipher key transmitted from said transmission unit of said management apparatus and said restoration user information file related to said security function module, wherein the authentication on the acquisition of the restoration user information file cipher key is made with respect to persons with authority and, when a plurality of persons of the persons with authority make the authentication on the acquisition of the restoration user information file cipher key in said restoration user information file cipher key authentication unit of said management apparatus, said transmission unit transmits the restoration user information file cipher key.

2. The management system according to claim 1, wherein said management apparatus further includes a history management unit for managing a transmission history of the restoration user information file cipher key from said transmission unit.

3. The management system according to claim 1, wherein said management apparatus makes the management in a state where a password related to the restoration user information file cipher key is associated with the information specifying said one of said plurality of terminal apparatuses, and said transmission unit notifies the password to said terminal apparatus in response to a request from said one of said plurality of terminal apparatuses for acquisition of the password.

4. The management system according to claim 3, wherein said management apparatus includes a password authentication unit for making an authentication on the acquisition of the password and, when the authentication on the acquisition of the password is made by said password authentication unit, said transmission unit notifies the password.

5. The management system according to claim 4, wherein the authentication on the acquisition of the password is made with respect to persons with authority and, when a plurality of persons of the persons with authority make the authentication on the acquisition of the password in said password authentication unit, said transmission unit notifies the password.

6. The management system according to claim 1, wherein each terminal apparatus further includes an erase unit for erasing the restoration user information file cipher key transmitted from said transmission unit of said management apparatus after the restoration of the user security information by said restoration unit.

7. A management apparatus communicable with a plurality of terminal apparatuses each having a security function module with a cipher processing function, comprising:

a unit that relates a terminal identifier identifying each terminal apparatus with both a restoration user information file related to the security function module provided in said each terminal apparatus, the restoration user information file being a backup data file to be used for restoring an environment of the corresponding security function module, and a restoration user information file cipher key related to a security function module of said each terminal apparatus;

a storage unit that stores, for all of said plurality of terminal apparatuses, said terminal identifiers, by relating said terminal identifiers with respective restoration user information files and respective restoration user information file cipher keys;

a transmission unit that transmits, to one of said plurality of terminal apparatuses, a restoration user information file cipher key corresponding to said one of said plurality of terminal apparatuses in response to a request from said one of said plurality of terminal apparatuses for the restoration user information file cipher key, and transmits, to said one of said plurality of terminal apparatuses, a restoration user information file corresponding to said one of said plurality of terminal apparatuses in response to a second request from said one of said plurality of terminal apparatuses for the restoration user information file, and a restoration user information file cipher key authentication unit for making an authentication on acquisition of the restoration user information file cipher key, when the authentication on the acquisition of the restoration user information file cipher key is made by said restoration user information file cipher key authentication unit, said transmission unit transmitting the restoration user information file cipher key, wherein the authentication on the acquisition of the restoration user information file cipher key is made with respect to persons with authority and, when a plurality of persons of the persons with authority make the authentication on the acquisition of the restoration user information file cipher key in said restoration user information file cipher key authentication unit, said transmission unit transmits the restoration user information file cipher key.

8. The management apparatus according to claim 7, further comprising a history management unit for managing a transmission history of the restoration user information file cipher key from said transmission unit.

9. The management apparatus according to claim 7, wherein a password related to the restoration user information file cipher key is managed in a state associated with the information specifying said one of said plurality of terminal apparatuses, and said transmission unit notifies the password to said terminal apparatus in response to a request from said one of said plurality of terminal apparatuses for acquisition of the password.

10. The management apparatus according to claim 9, further comprising a password authentication unit for making an authentication on the acquisition of the password, when the authentication on the acquisition of the password is made by said password authentication unit, said transmission unit notifying the password.

11. The management apparatus according to claim 10, wherein the authentication on the acquisition of the password is made with respect to persons with authority and, when a plurality of persons of the persons with the authority make the authentication on the acquisition of the password in said password authentication unit, said transmission unit notifies the password.

12. The management apparatus according to claim 7, wherein the terminal identifier specifying each terminal apparatus is arbitrarily set in advance for said each terminal apparatus.

13. The management apparatus according to claim 7, wherein the terminal identifier specifying each terminal apparatus is an MAC (media Access Control) address of said each terminal apparatus.

14. A method for managing a plurality of terminal apparatuses each having a security function module with a cipher processing function, said method comprising:

relating a terminal identifier identifying each terminal apparatus with both a restoration user information file related to the security function module provided in said each terminal apparatus, and a restoration user information file cipher key related to a security function module of said each terminal apparatus;

storing, for all of said plurality of terminal apparatuses, said terminal identifiers, by relating said terminal identifiers with respective restoration user information files, the restoration user information file being a backup data file to be used for restoring an environment of the corresponding security function module, and respective restoration user information file cipher keys;

receiving a request from one of said plurality of terminal apparatuses for the restoration user information file cipher key and a second request from said one of said plurality of terminal apparatuses for the restoration user information file; and transmitting the restoration user information file cipher key corresponding to said one of said plurality of terminal apparatuses to said one of said plurality of terminal apparatuses in response to said request, and transmitting, to said one of said plurality of terminal apparatuses, a restoration user information file corresponding to said one of said plurality of terminal apparatuses in response to said second request.

\* \* \* \* \*